United States Patent [19]
Pruitt et al.
[11] Patent Number: 4,637,201
[45] Date of Patent: Jan. 20, 1987

[54] WIDE-CUT WINDROWER-CONDITIONER HAVING UNIFORM CROP DISTRIBUTION AND CONDITIONING

[75] Inventors: Martin E. Pruitt, Hesston; Cecil L. Case; David P. Fritz, both of Newton, all of Kans.

[73] Assignee: Hesston Corporation, Hesston, Kans.

[21] Appl. No.: 633,933

[22] Filed: Jul. 24, 1984

[51] Int. Cl.[4] .......... A01D 45/02
[52] U.S. Cl. .......... 56/16.4; 56/14.5; 56/DIG. 1
[58] Field of Search .......... 56/1, 14.4, 14.5, 16.4, 56/192, 364, DIG. 1

[56] References Cited

U.S. PATENT DOCUMENTS 3,780,506 12/1973 Tashiro .......... 56/14.5
3,851,450 12/1974 Nelson .......... 56/364
3,872,657 3/1975 Ramacher et al. .......... 56/364

*Primary Examiner*—Robert Peshock
*Assistant Examiner*—David I. Tarnoff
*Attorney, Agent, or Firm*—Schmidt, Johnson, Hovey & Williams

[57] ABSTRACT

Standing crops severed by sickle mechanism at the leading edge of the machine are swept upwardly and rearwardly along a platform by a rotating reel to a lower, center-gathering auger and an upper, spaced distributing auger that converge the materials centrally and distribute them evenly across a discharge opening ahead of rearwardly positioned conditioning rolls. As severed materials pass through the machine, the flow is gently and progressively converged vertically due to the distances between the reel and the underlying platform, the two augers, and the conditioning rolls becoming progressively smaller. The lower auger serves as the primary central-gatherer, while the upper auger performs primarily as a distributor to spread materials which have been gathered by the lower auger over a substantial width of the discharge opening to the conditioning rolls, hence providing a generally uniformly thick and dense flow to the conditioner rolls instead of one which is congested and bunchy at opposite ends of the rolls.

14 Claims, 6 Drawing Figures

30
46
68
72
70
54
44
42
40
C
80
B
58
56
64
66
52
40
A
32
62
34

10
60
14
16
12
20
54
56
68
22
26
36
40
30
28
18
24

86
84
54
82
62

36

54
62

68
30
36

WIDE-CUT WINDROWER-CONDITIONER HAVING UNIFORM CROP DISTRIBUTION AND CONDITIONING

TECHNICAL FIELD

This invention relates to the field of crop harvesters of the type which are typically used in the mowing and conditioning of hay crops in preparation of subsequent baling or stacking thereof.

BACKGROUND

Harvesters which are variously referred to as windrowers or windrower-conditioners normally perform a combination of several different, simultaneous operations on a hay crop during a single pass across a field, including mowing the standing crops from the field, feeding the severed materials between a pair of oppositely rotating conditioning rolls which crimp or bruise the plant stems to promote rapid curing, and redepositing the conditioned materials onto the ground in a windrow or swath. In some cases, the conditioning rolls are shorter than the width of cut taken by the header, requiring then that the cut materials be collected and gathered inwardly to some extent before they are passed rearwardly through a discharge opening which leads to the conditioning rolls.

It is a common expedient to use a center-gathering auger for this purpose. However, while such an auger performs adequately in many conditions, we have found that in certain situations relying upon a mere auger of that type to perform the gathering of severed materials for presentation to the conditioning rolls can lead to serious problems.

For example, as the difference between the cutting width of the header and the length of the conditioning rolls increases significantly, it has been noted that the tendency is for the entire mass of the laterally collected materials to immediately turn rearwardly upon reaching the opening and thus bunch up at that locatiom, causing the crop mat flowing between the rolls to be excessively heavy and thick at its opposite ends. This creates a significant lack of uniformity across the length of the conditioning rolls and, in turn, results in a lack of uniform conditioning action on the materials flowing therethrough. Therefore, the conditioning rolls, which are normally yieldably separable to accept thicker mats of material when necessary, will tend to aggressively condition those materials on the surface of the bunched-up masses at opposite ends of the rolls and skip the thinner, less dense stream of materials flowing through the center thereof. Consequently, the crops dry at irregular rates in the windrow or swath, leading to poor quality hay products.

Furthermore, concentrating bunches of the materials at opposite ends of the conditioning rolls leads to premature wear of the rolls at those locations which contributes to improper conditioning and precipitates earlier than desired replacement of the rolls by the farmer. These problems are even further exacerbated where the crops being harvested are tall, tough, stemmy and tangled materials.

SUMMARY OF THE PRESENT INVENTION

Accordingly, one important object of the present invention is to provide a way of more evenly and uniformly distributing center-gathered crop materials in a windrower-conditioner over the full length of the conditioning rolls thereof so as to alleviate the problems mentioned above, yet at the same time avoid undue handling and abuse to the crop materials consistent with an unexcessive increase in horsepower requirements for the harvester.

To this end, the present invention contemplates having the center-gathering auger of the harvester rotate in such a direction that the crop materials are passed upwardly and rearwardly over the auger and simultaneously under an overhead distributer spaced substantially above the lower auger. The distributer gently controls the materials and, without pinching and squeezing, encourages them to spread out evenly along the full length of the lower auger. Preferably, the upper distributer and controller takes the form of a second auger substantially similar to the lower auger but rotating in the opposite direction. Ideally, the throat which is defined between the two augers has a vertical dimension which is substantially larger than the nip defined between the two conditioning rolls, yet is somewhat less than the minimum clearance between reel bats of the harvester and the platform surface therebelow so that the crop flow through the machine, instead of encountering abrupt, severe pinch points and experiencing a sudden, drastic reduction in thickness, is gently and progressively converged along the way in a vertical sense for presentation to the conditioning rolls.

DETAILED DESCRIPTION

Figure 1:
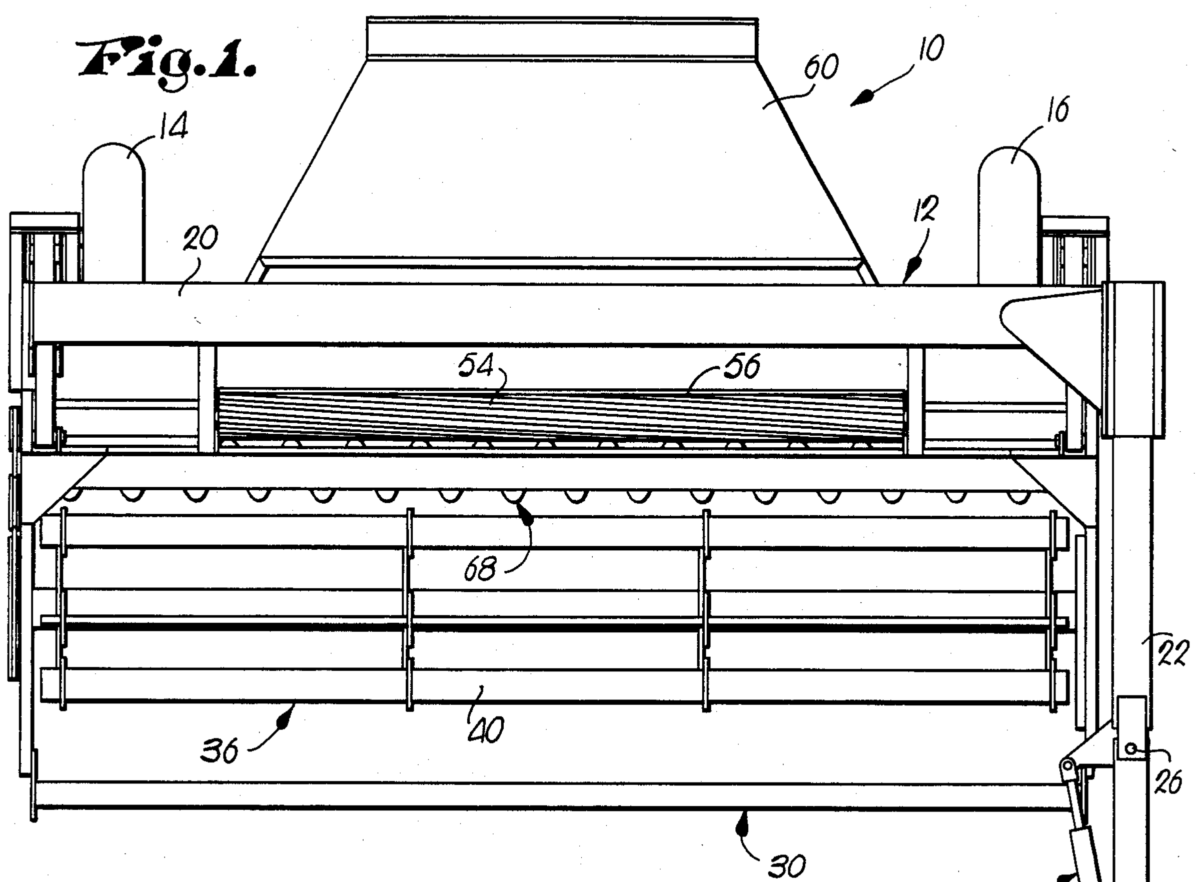
FIG. 1 is a top plan view of a windrower-conditioner constructed in accordance with the principles of the present invention.

The windrower-conditioner 10 is provided with a mobile chassis 12 carried by ground wheels 14 and 16 for movement across a field to be harvested. A towing tongue 18 extends forwardly from one end of a crossbeam 20 of the chassis 12 for connection at its forward end with the hitch of a towing vehicle (not shown). The tongue 18 includes a rear section 22 rigidly attached to the crossbeam 20, and a front section 24 pivotally connected at 26 to the front end of rear section 22 for swinging movement about an upright axis under the influence of a double-acting piston and cylinder assembly 28 which operably interconnects the two sections 22 and 24, thus permitting the chassis 12 to be disposed in a laterally offset position as shown in FIG. 1 relative to the towing vehicle, or in an in-line position (not shown) essentially directly behind such vehicle.

Figure 3:
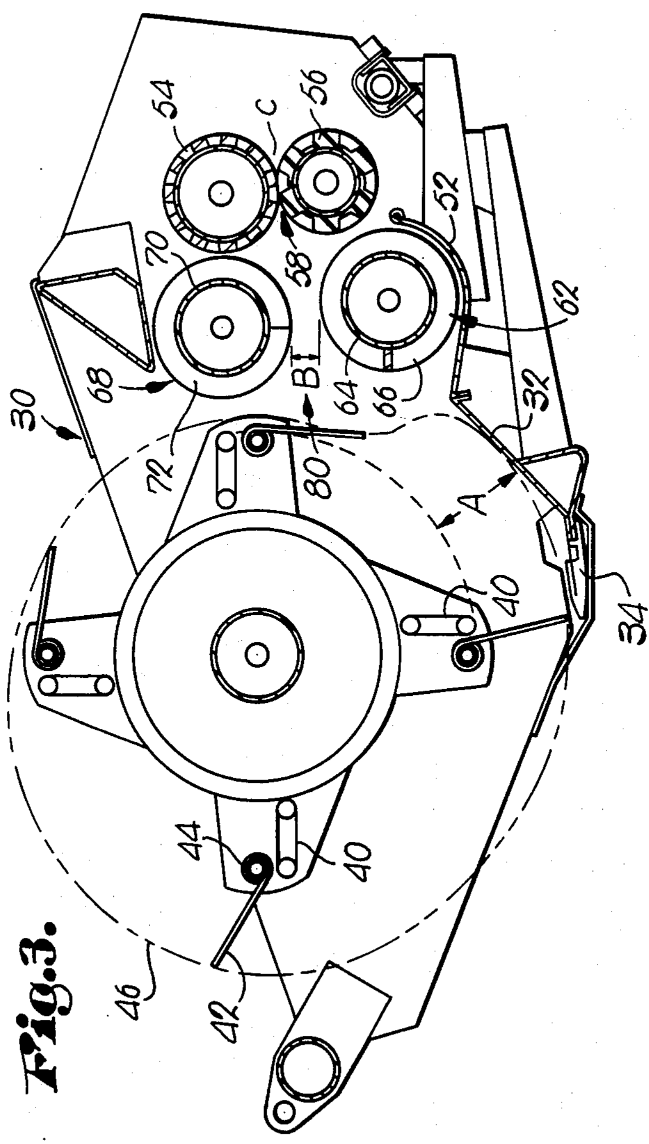
FIG. 3 is a transverse cross-sectional view through the machine taken substantially along line 3—3 of FIG. 2.

A harvesting header broadly denoted by the numeral 30 is supported by the chassis 12 for advancement therewith across a field. As well understood by those skilled in the art, the header 30 includes an upwardly and rearwardly sloping platform 32 having severing means at its forward transverse edge in the form of a reciprocable sickle 34. A reel 36 is supported by the frame of the header 30 above the sickle 34 for rotation about a transverse, horizontal axis defined by the shaft 38, the reel 36 including a plurality of transversely extending, circumferentially spacedapart members or bats 40 extending parallel to the axis 38 and having a minimum clearance distance "A" with the platform 32 during rotation of reel 36. The reel 36 is rotated in a counterclockwise direction viewing FIG. 3 during operation, and crop-engaging tines 42 carried by crosspipes 44 adjacent the bats 40 are caused to follow the phantom line path of travel 46 by a cam mechanism (not shown) during such rotation of the reel 36.

Figure 4:
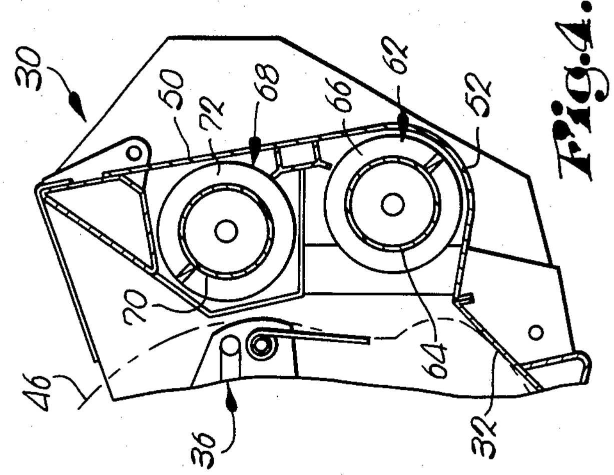
FIG. 4 is fragmentary transverse cross-sectional view thereof taken substantially along line 4—4 of FIG. 2.
Figure 2:
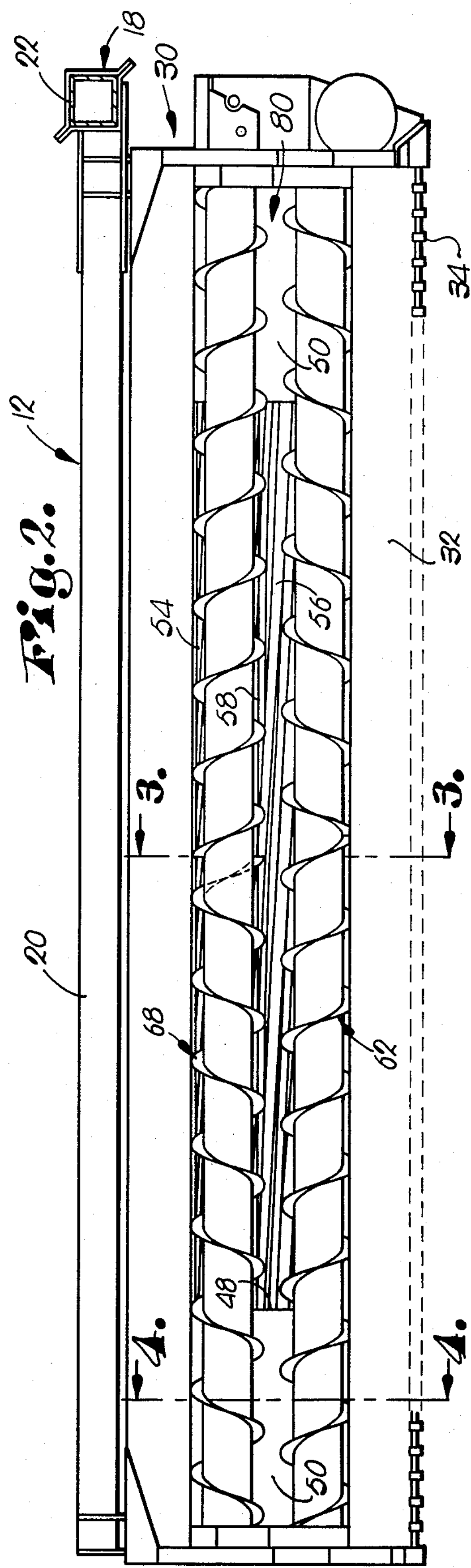
FIG. 2 is a fragmentary front elevational view thereof with the reel and forward portion of the towing tongue removed to show details of construction.

The frame of the header 30 defines a discharge opening 48 at the rear extremity of platform 32. As illustrated in FIGS. 2 and 4, a pair of generally vertically extending, rear walls 50 are disposed on opposite sides of the opening 48, and a concave, transverse pan 52 is positioned at the lower extremity of the rear walls 50 and forwardly of the opening 48. A pair of oppositely rotatable crop conditioning rolls 54 and 56 are supported by the frame in and immediately behind opening 48 for rotation about respective horizontal axes, the upper roll 54 being driven in a counterclockwise direction viewing FIG. 3 and the lower roll 56 being driven in a clockwise direction viewing that same figure by mechanism not shown. The rolls 54, 56 are substantially shorter than the sickle 34, and it will be understood by those skilled in the art that as is conventional, rolls 54, 56 are yieldably biased toward one another to present a biting nip 58 therebetween that is operable to receive materials from the opening 48 and to subsequently propel such materials rearwardly into a windrow or swath-forming shield 60 (FIG. 1) after conditioning the materials.

In accordance with the present invention, the header 30 is also provided with means between the sickle 34 and the shorter conditioning rolls 54, 56 for inwardly gathering crops which have been severed in front of and laterally outboard of the opening 48 (in front of the rear walls 50) and for distributing such materials uniformly along the width of the opening 48 before projecting them rearwarldy into the conditioning rolls 54, 56. In this respect, a center-gathering auger 62 is supported by the header frame within the pan 52 and extends across the header beyond the opposite ends of the conditioning rolls 54, 56, in the illustrated embodiment of substantially the full length of cut taken by the sickle 34. The auger 62 is mounted for rotation in a clockwise direction viewing FIG. 3 and is provided with a cylindrical core 64 to which are secured helically extending external vanes 66 disposed in such a manner as to move the crop axially toward the center of the opening 48 upon such rotation of auger 62. It will be noted in this respect that the vanes 66 are of opposite inclination on opposite sides of the midpoint of auger 62 and have a radial depth which is substantially less than the diameter of the core 64.

Spaced above the primary gathering auger 62 is a secondary, controlling and distributing auger 68 which likewise extends beyond the opposite ends of the conditioning rolls 54, 56 and is rotatable about a transverse horizontal axis parallel to the axes of rotation of the reel 36, the conditioning rolls 54, 56 and the lower auger 62. The upper auger 68 is driven in the same direction as the upper conditioning roll 54, i.e., in a counterclockwise direction viewing FIG. 3. Further, the upper auger 68 has a cylindrical core 70 and helical vanes 72 secured to the periphery thereof in such a manner as to urge materials inwardly toward the center of the opening 48 when the auger 68 is rotated during operation, it being noted that, as with the auger 62, the vanes 72 on opposite sides of the midpoint of auger 68 are oppositely inclined.

The upper distributing auger 68 is sufficiently spaced above the lower gathering auger 62 as to define a throat 80 between the same and the lower auger 62. In its preferred form, the throat 80 has a vertical dimension "B" that is substantially greater than the dimension "C" of biting nip 58 between conditioning rolls 54, 56 (when the latter are spring-biased into engagement with one another) and is less than the distance "A" between the bats 40 and the platform 32. Thus, the crop flow path through the machine progressively converges as points A, B, and C are consecutively passed.

OPERATION

As the machine 10 is advanced across a field of standing crops, the sickle 34 severs such crops, assisted by the reel 36, and the severed materials are swept upwardly and rearwardly along the platform 32 by the tines 42 to the lower auger 62. There the materials are gently lifted up and over the auger 62, partly due to the vanes 66, the rotation of the reel 36, and the forward momentum of the machine, and move into and through the throat 80 and thence on to the conditioning rolls 54, 56 which crimp the stems of the materials and propel them rearwardly for subsequent deposit on the ground under the deflecting influence of the forming shields 60.

Figure 5:
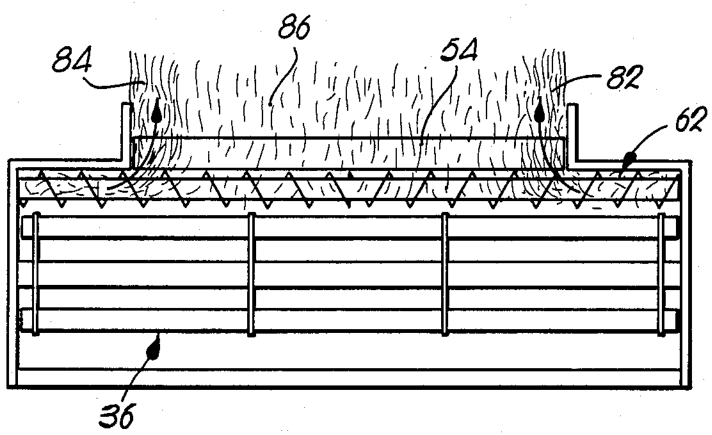
FIG. 5 is a schematic top plan view illustrating the bunching problem which has been found to exist when only a single, lower center-gathering auger is utilized in situations where the conditioning rolls are substantially shorter than the width of cut taken by the harvester.

During this operation, those crop materials which are severed by sickle 34 outboard of the opening 48 and rolls 54, 56 are conveyed inwardly toward the center of the machine by the auger vanes 66 located in front of the rear walls 50. However, it was found during development of the present invention that if the lower auger 62 and its vanes 66 alone were utilized, an action resembling that depicted in FIG. 5 was frequently the result in severe crop conditions, particularly where the cut taken by the sickle 34 was substantially wider than the length of the conditioning rolls 54, 56. In that instance, the outboard materials, once reaching the lateral extremities of the opening 48, tended to immediately turn the corner and flow rearwardly to the conditioning rolls 54, 56 as illustrated by the areas of concentration denoted by the numerals 82 and 84 in FIG. 5. This bunching of extra materials at opposite ends of the conditioning rolls 54, 56 resulted in a central portion 86 of the crop flow which was substantially less dense and concentrated than the areas 82, 84.

Figure 6:
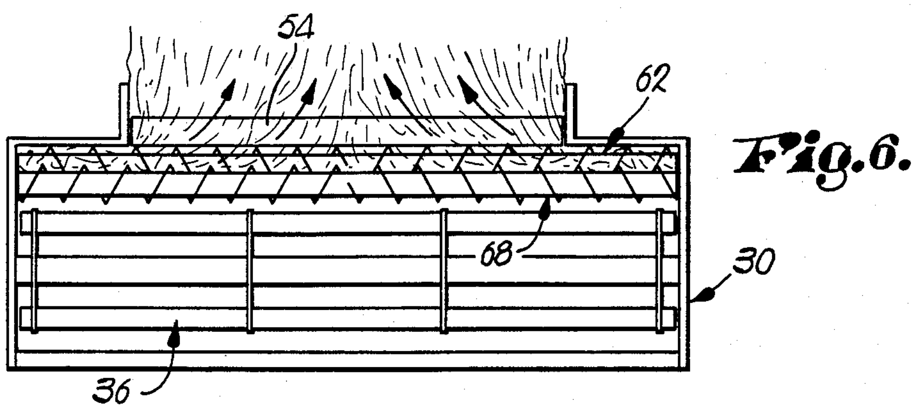
FIG. 6 is a schematic, top plan view similar to FIG. 5 but illustrating how the present invention serves to dissipate the bunching problem and provide a more uniform distribution of hay across the length of the conditioning rolls in that type of machine.

However, upon adding upwardly spaced, overhead distributing means such as the auger 68 with its vanes 72 which are moving laterally inwardly at all times, it was found that the crop flow to the conditioning rolls 54, 56 became much more uniform as illustrated schematically in FIG. 6. Thus, crops presented to the rolls 54, 56 are more evenly conditioned across the full length of the rolls 54, 56, the resulting windrow or swath is itself of more uniform density and shape, and the opposite ends of the conditioning rolls 54, 56 do not experience the premature wear expected when the condition of FIG. 5 exists.

It is important to note that crop materials flowing through the machine are gently yet positively handled and controlled. With respect to flow thickness, it will be appreciated that the flow is gradually and progressively funneled down or converged due to the progressively decreasing dimensions A, B, and C at points of restriction in the header. The lack of sudden and severe constrictions upstream from the conditioning rolls 54, 56 helps avoid problems created by overaggresive handling of the crop, while having some order of constriction at the augers 62, 68 relative to dimension A between bats 40 and platform 32 helps prepare the crop materials for their imminent movement through the nip 58 at conditioning rolls 54, 56.

With respect to disbribution side-to-side, the upper auger 68 is gentle yet positive, and does not grind or pinch the materials against lower auger 62. The role of the distributing auger 78 is not primarily that of a feeding driver, but rather that of a device to spread, disseminate, and gently distribute the crop materials as evenly as possible across the top and front of the lower auger 62 while secondarily converging, controlling and, to some extent, feeding the crop rearwardly. Depending upon crop conditions, the upper auger 68 may only very lightly engage the crop materials, while in other heavy, tangled, stemmy crops, the upper auger 68 may be a more positive influence in spreading outboard materials across the full width of the opening 48.

It will also be appreciated that the upper auger 68 serves as an aggressive stripper of the reel 36 which is moving upwardly past the auger 68 and may tend to otherwise carry with it some of the crop materials. However, the downwardly moving proximal extremity of the upper auger 68 helps prevet this action and to confine the loose, severed, flowing materials in a trough-like manner generally above and in front of the lower auger 62 and behind the reel 36.

We claim:

1. In a crop harvesting header:

means at a leading transverse edge of the header for severing a standing crop from the ground as the header is moved across a field;

means defining a discharge opening in the header spaced rearwardly from said severing means, said opening having a transverse width which is less than the width of cut taken by said severing means;

an elongated, transversely extending auger positioned between said severing means and the opening and extending laterally outwardly in opposite directions beyond the lateral extremities of said opening, said auger being rotated in a direction to feed crop materials up and over itself during harvesting operations and being provided with helical vanes disposed to converge materials centrally from areas laterally outboard of said opening and to project the same rearwardly through the opening; and distribution means spaced above said auger to define, in cooperation with the latter, a throat through which the crop materials pass during movement to said opening, said distribution means including cropengaging structure movable laterally inwardly along said throat from opposite ends thereof as crop materials are passing therethrough for spreading such materials uniformly across the opening.

2. In a crop header as claimed in claim 1, wherein said distribution means comprises a second elongated, transversely extending auger rotatable in a direction opposite to that of the first-mentioned auger, said structure including helical vanes.

3. In a crop header as claimed in claim 2, wherein said augers are of equal length.

4. In a crop header as claimed in claim 2; and a pair of oppositely rotatable crop conditioning rolls spaced behind said augers in disposition for receiving crop materials therefrom, said conditioning rolls cooperating to define a crop-gripping nip therebetween, said throat being substantially wider vertically than said nip.

5. In a crop header as claimed in claim 2, wherein said augers are of at least substantially equal diameters.

6. In a crop header as claimed in claim 2, wherein each of said augers has a cylindrical core upon which the vanes thereof are secured, the vanes of said augers having radial depths which are less than the diameters of their respective cores.

7. In a crop header as claimed in claim 6, wherein the vanes of one auger are at least substantially similar in radial depth to the vanes of the other auger.

8. In a crop header as claimed in claim 1; and a pair of oppositely rotatable crop conditioning rolls spaced behind said auger in disposition for receiving crop materials therefrom, said conditioning rolls cooperating to define a crop-gripping nip therebetween, said throat being substantially wider vertically than said nip.

9. In a crop header as claimed in claim 1; and a reel positioned above said severing means and rotatable about a transverse axis for assisting in severance of the standing crop and delivery thereof to said auger, said header having a platform and said reel having transverse members extending parallel to said axis which sweep upwardly and rearwardly above said platform during operation, said members each having a minimum clearance distance from said platform which exceeds the vertical width of said throat.

10. In a crop harvesting header:

a mobile frame;

means at a leading extremity of the frame for severing standing crops as the frame is advanced across a field;

a discharge opening spaced rearwardly from said severing means and having a reduced transverse dimension relative to the severing means;

a pair of transversely extending oppositely rotatable crop conditioning rolls mounted on said frame in disposition for receiving crop materials from said opening, said conditioning rolls cooperating to define a crop-biting nip therebetween; and a pair of vertically-spaced, oppositely-rotatable, transversely-extending augers carried by said frame between said severing means and the opening, said augers cooperating to define a throat therebetween through which crop materials pass during movement to said opening and the conditioning rolls, said throat having a vertical dimension substantially greater than that of said nip.

11. In a crop harvesting header as claimed in claim 10, wherein said frame is provided with a platform extending rearwardly from said severing means toward said augers and with a reel rotatably carried above the platform for sweeping severed materials rearwardly along the latter toward said augers, said reel having transverse members extending parallel to the axis of rotation of the reel, said vertical dimension of the throat being less than the minimum distance between the members of the reel and said platform during each revolution of the reel.

12. In a crop harvesting header:

a mobile frame;

means at a leading extremity of the frame for severing standing crops as the frame is advanced across a field;

a discharge opening spaced rearwardly from said severing means and having a reduced transverse dimension relative to the severing means;

an upwardly and rearwardly inclined platform on said frame extending between said severing means and said discharge opening;

a reel rotatably carried by said frame above said severing means for sweeping severed crops upwardly and rearwardly along said platform toward said opening, said reel including a plurality of transverse members extending parallel to the axis of rotation of the reel and passing a certain clearance distance above the platform at the lowest point in their rotation above the latter;

a pair of transversely extending, oppositely rotatable crop conditioning rolls mounted on said frame in disposition for receiving crop materials from said opening and projecting the materials rearwardly, said conditioning rolls cooperating to define a crop-biting nip therebetween; and a pair of vertically-spaced, oppositely-rotatable, transverse augers carried by said frame between said severing means and the opening and extending laterally outwardly in opposite directions beyond the lateral extremities of said opening, the clearance distance between said reel members and the platform, the spacing between said augers, and the nip between said conditioning rolls becoming progressively relatively smaller as the conditioning rolls are approached from the leading extremity of the frame whereby to cooperatively define a progressively vertically converging flow path for severed crop materials moving through the header.

13. In a crop harvester:

means for moving severed crop materials along a path of travel toward a point of discharge;

a pair of vertically spaced-apart, transverse augers between said moving means and the point of discharge within said path of travel of the crop materials; and means for driving said augers in such mutually opposite rotative directions as to cause the augers to receive the crop materials from said moving means, distribute the materials axially inwardly along their mutually opposed, peripheral surfaces, and deliver the distributed materials to said discharge point.

14. In a crop harvesting header:

a mobile frame;

means at a leading extremity of the frame for severing standing crops as the frame is advanced across a field;

a pair of transversely extending oppositely rotatable crop conditioning rolls mounted on said frame rearwardly of said severing means, said conditioning rolls cooperating to define a crop-biting nip therebetween and being shorter than the width of cut taken by said severing means;

first transverse, center-gathering auger means positioned between said severing means and the conditioning rolls, said first auger means being longer than said conditioning rolls and rotatable in a direction to pass crop materials up and over itself during field operation; and second transverse auger means spaced above said first auger means and rotatable oppositely thereof for cooperating with said first auger means in moving severed crop materials laterally inwardly to the conditioning rolls, the spacing between said auger means being substantially greater than said nip between the conditioning rolls.

* * * * *